(12) United States Patent
von Thenen et al.

(10) Patent No.: US 9,292,327 B1
(45) Date of Patent: *Mar. 22, 2016

(54) OPTIMIZATION FOR INCREMENTAL BACKUP OF VMS

(71) Applicant: EMC Corporation, Hopkinton, MA (US)

(72) Inventors: David von Thenen, Hopkinton, MA (US); Steven Kwong, Hopkinton, MA (US); Nimrod Nahum, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/290,928

(22) Filed: May 29, 2014

(51) Int. Cl.
*G06F 9/455* (2006.01)
*G06F 11/14* (2006.01)

(52) U.S. Cl.
CPC ........ *G06F 9/45533* (2013.01); *G06F 11/1451* (2013.01)

(58) Field of Classification Search
None
See application file for complete search history.

(56) References Cited

U.S. PATENT DOCUMENTS

| 5,133,065 | A  | * | 7/1992  | Cheffetz  | G06F 11/1464 714/2 |
|---|---|---|---|---|---|
| 6,038,379 | A  | * | 3/2000  | Fletcher  | G06F 11/1456 707/999.01 |
| 6,330,570 | B1 | * | 12/2001 | Crighton  | G06F 11/1458 |
| 6,552,672 | B1 | * | 4/2003  | Ghildiyal | G11B 20/00007 341/106 |
| 6,665,815 | B1 | * | 12/2003 | Goldstein | G06F 11/1451 714/20 |
| 6,694,413 | B1 | * | 2/2004  | Mimatsu   | G06F 11/1466 707/999.202 |
| 7,007,044 | B1 | * | 2/2006  | Rafert    | G06F 11/2082 707/655 |
| 7,024,527 | B1 | * | 4/2006  | Ohr       | G06F 11/1464 100/154 |
| 7,251,713 | B1 | * | 7/2007  | Zhang     | G06F 11/1466 709/227 |
| 7,562,203 | B2 | * | 7/2009  | Scott     | G06F 3/0608 711/112 |
| 8,099,391 | B1 | * | 1/2012  | Monckton  | G06F 11/1451 707/647 |
| 8,225,133 | B1 | * | 7/2012  | Lyadvinsky| G06F 11/1417 714/10 |

(Continued)

OTHER PUBLICATIONS

Shibakawa et al. "Design and Implementation of Multiagent-based Distributed Backup System", 2013 IEEE, pp. 235-239.*

(Continued)

*Primary Examiner* — Van Nguyen
(74) *Attorney, Agent, or Firm* — Blakely, Sokoloff, Taylor & Zafman LLP

(57) ABSTRACT

A method for backing up virtual machine (VM) data is described, and includes determining a disk layout of a VM disk associated with the first VM to be backed up, the disk layout having a plurality of nodes in a hierarchical structure, each node corresponding a VM, and traversing the VM disk layout to identify one or more parent nodes with respect to a first node representing the first VM. The method further includes, for each second VMs that is related to the first VM as a parent node, determining whether the second VM has been previously backed up by examining a predetermined tag. If the second VM has not been previously backed up, then back up a list of changed blocks representing a difference between the second and third VMs. Otherwise, back up the second VM and tag the second VM to indicate that it has been backed up.

21 Claims, 13 Drawing Sheets

(56) References Cited

U.S. PATENT DOCUMENTS

| | | | |
|---|---|---|---|
| 8,805,788 B2* | 8/2014 | Gross, IV | G06F 11/1451 707/649 |
| 8,832,029 B2* | 9/2014 | Bezbaruah | G06F 9/45558 707/646 |
| 2013/0262390 A1* | 10/2013 | Kumarasamy | H04L 41/08 707/649 |
| 2013/0262801 A1* | 10/2013 | Sancheti | G06F 3/065 711/162 |
| 2014/0040205 A1* | 2/2014 | Cometto | G06F 13/18 707/639 |
| 2014/0095816 A1* | 4/2014 | Hsu | G06F 3/0655 711/162 |
| 2014/0236892 A1* | 8/2014 | Blyler | G06F 17/30233 707/625 |
| 2014/0365740 A1* | 12/2014 | Vasilyev | G06F 11/1451 711/162 |

OTHER PUBLICATIONS

Jing-fang "Technical Research of Storage and Backup System in Stated-Owned Enterprise", 2010 IEEE, pp. 481-483.*

Gao et al. "Implementation of EIDE Disk Array System for Mass Data Backup", 2004 IEEE, pp. 24-29.*

Ismail et al. "Architecture of Scalable Backup Service for Private Cloud", 2013 IEEE, pp. 174-179.*

Ahmad et al. "An Analysis of Disk Performance in VMware ESX Server Virtual Machines", 2003 IEEE, pp. 65-76.*

* cited by examiner

"[vCP BG Cloud Datastore1] vAppRHEL (a3c79ef1-0b10-413c-9415-a1c66086bc85)/vAppRHEL (a3c79ef1-0b10-413c-9415-a1c66086bc85).vmdk"← 702
"[vCP BG Cloud Datastore1] vAppRHEL (8edcce1f-19fa-409b-9342-4352992897fb)/vAppRHEL (8edcce1f-19fa-409b-9342-4352992897fb).vmdk" ← 704
"[vCP BG Cloud Datastore1] vAppRHEL (578800fa-4cfb-414d-bc48-92846e779837)/vAppRHEL (578800fa-4cfb-414d-bc48-92846e779837).vmdk" ← 706

FIG. 7

OPTIMIZATION FOR INCREMENTAL BACKUP OF VMS

CROSS REFERENCE TO RELATED APPLICATIONS

This application is related to U.S. patent application Ser. No. 14/290,898 filed May 29, 2014.

FIELD OF THE INVENTION

Embodiments of the present invention relate generally to backup systems. More particularly, embodiments of the invention relate to backup of cloned child virtual machines.

BACKGROUND

Modern corporations frequently use virtual machine and hypervisor technology to allow multiple guest operating systems to run on a single host machine. This allows the corporation to maximize the resources of the host machines it owns. A corporation can also easily duplicate and modify instances of virtual machines, and revert and delete virtual machines using various interfaces provided by the virtual machine software vendor. The virtual machine software may run directly on the hardware ("bare metal hypervisor") or on a host operating system running on the hardware. The hardware may further be customized to virtual machine execution, e.g., by having solid state drives to increase disk I/O.

The ease of modifying virtual machine instances has prompted virtual machine software vendors to introduce snapshot and cloning features. These features allow an administrator to create a snapshot of the state of a virtual machine, preserving the state of the virtual machine at the snapshot creation time. Furthermore, cloned virtual machines, which may be known as "child" virtual machines, may be created from these snapshots of the "parent" virtual machine. These child virtual machines include all the data of the snapshot of the parent virtual machine, and changes to the child virtual machine do not affect the snapshot or the original parent virtual machine. Furthermore, these child virtual machines may be created without the need to make an entire copy of the parent snapshot.

BRIEF DESCRIPTION OF THE DRAWINGS

Embodiments of the invention are illustrated by way of example and not limitation in the figures of the accompanying drawings in which like references indicate similar elements.

FIG. 7 illustrates set of exemplary identifiers for a chain of linked VM disks for a child VM according to an embodiment of the invention.

DETAILED DESCRIPTION

Figure 1:
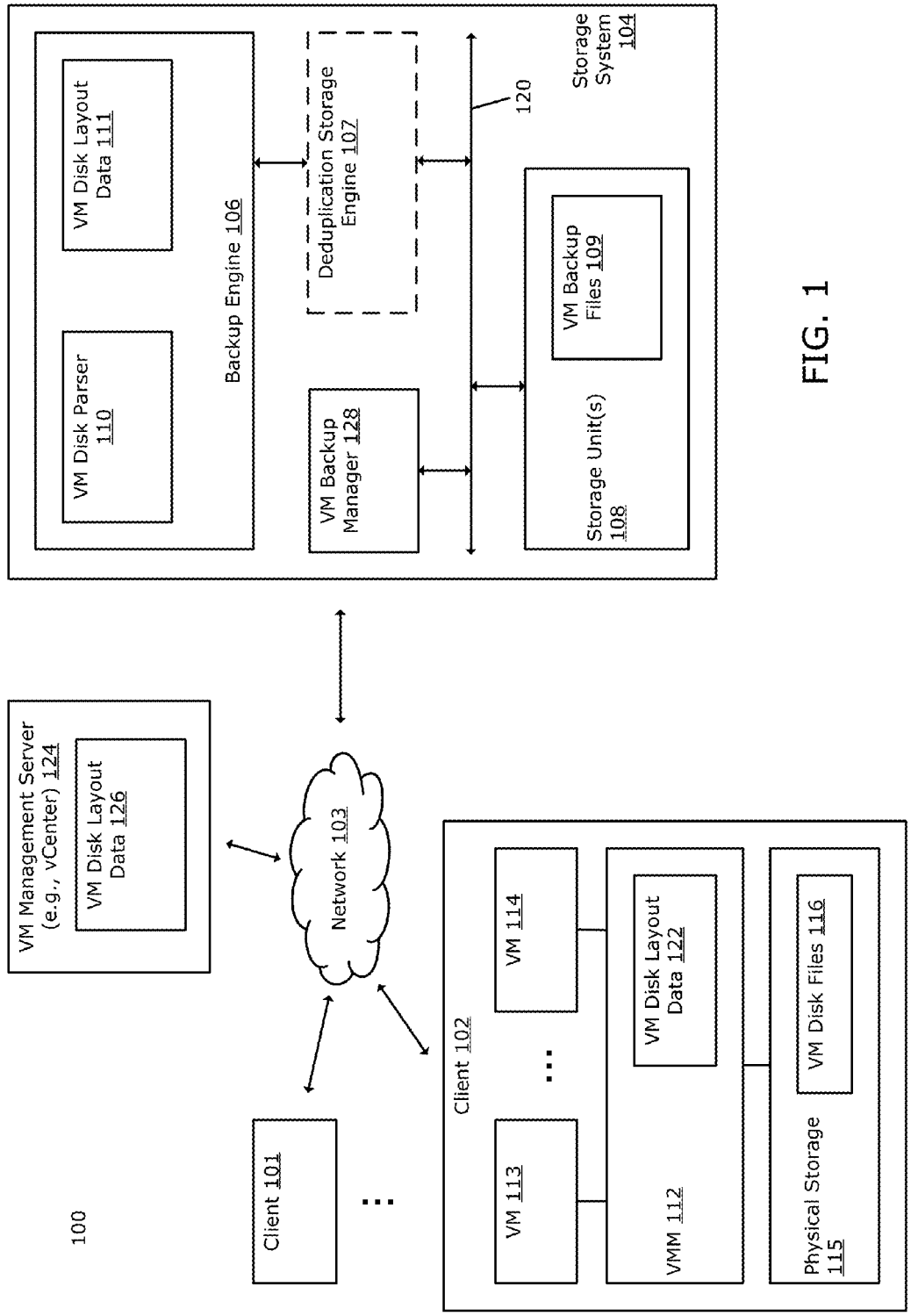
FIG. 1 is a block diagram illustrating a backup system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Modern corporations frequently use virtual machine and hypervisor technology to allow multiple guest operating systems to run on a single host machine. This allows the corporation to maximize the resources of the host machines it owns. A corporation can also easily duplicate and modify instances of virtual machines, and revert and delete virtual machines using various interfaces provided by the virtual machine software vendor. The virtual machine software may run directly on the hardware ("bare metal hypervisor") or on a host operating system running on the hardware. The hardware may further be customized to virtual machine execution, e.g., by having solid state drives to increase disk I/O.

The ease of modifying virtual machine instances has prompted virtual machine software vendors to introduce snapshot and cloning features. These features allow an administrator to create a snapshot of the state of a virtual machine, preserving the state of the virtual machine at the snapshot creation time. Furthermore, cloned virtual machines, which may be known as "child" virtual machines, may be created from these snapshots of the "parent" virtual machine. These child virtual machines include all the data of the snapshot of the parent virtual machine, and changes to the child virtual machine do not affect the snapshot or the original parent virtual machine. Furthermore, these child virtual machines may be created without the need to make an entire copy of the parent snapshot.

In any of these virtual machine systems that support clones, the clones only include files that store the changes (either cumulative or incremental) that have been made in comparison to the parent virtual machine. These files may be sparse files, which represent the files of the parent VM, but only are filled when a corresponding location on the parent VM file is changed in the same location on the child VM. In this fashion, the files for the child VM are kept small, and the creation of the child will be fast in comparison to making an entire copy of the parent VM as there is no need to copy the data files for the parent, which may take a long time depending on the size of the parent VM.

One virtual machine vendor that implements this type of cloning mechanism is VMWare® (Palo Alto, Calif.). Such clones in VMWare are called Linked Clones or Fast Provisioned VMs, and are available in VMware®. Horizon View (formerly VMware View). VMware® vCloud Director (VCD), or vCenter® Server (via end-user hand-rolled creation).

One challenge is to be able to backup these clones is that a backup system needs to discover the structure of the parent and child relationships between the virtual machines in order to preserve this relationship in the backup. Otherwise, a backup system will instead create backups of child virtual machines (VMs) that all the data of the underlying virtual machine. Not only does this take up additional space, but when this child is restored, it is restored as a full virtual machine and not as a cloned child machine.

Furthermore, the virtual machine system may further support child VMs that have more than one parent. In this case, the child includes more than one data file, with some of the data files corresponding to data files for each parent that the child "inherits" data from. A child may further also inherit from another intermediate VM that inherits from a parent VM or from yet another intermediate VM. Thus, there may be multiple VMs between a root VM, which does not further inherit from another VM, and the child VM at the bottommost inheritance level.

These further cases further increase the complexity of a virtual machine that supports cloned VMs, and a backup system that backs up these interrelated VMs without accounting for the structure of the VMs risks the danger of duplicating an enormous amount of data and expending more time performing the backup than necessary.

According to some embodiments, a backup system receives a request to back up a first virtual machine (VM) of a storage system. In response to this request, the system determines the disk layout of the VM. This first VM may be a child VM, and so its disk layout includes multiple nodes in a hierarchical structure. Each node in the disk layout corresponds to a VM, which may be a parent of the child VM. The backup system traverses this disk layout to determine the storage location of the VM configuration data for the parent VM to the child VM. The system then identifies a snapshot for the child and a snapshot for the parent VM, and determines the changed blocks between these two snapshots. These changed blocks are then backed up by the system.

An additional optimization that can be made to such a backup system is to consolidate those parent VM backups such that if multiple child VMs are linked to the same parent VMs, when backing up those child VMs, the parent VMs are not backed up more than once. A challenge of implementing such an optimization is that the backup system needs to know whether the parent VM that has already been backed up is current in relation to the child VM that the backup system has received a backup request for. If the backup of the parent VM is not current (e.g., within a past predetermined period of time), the backup of the change data for the child VM would not be able to be linked up to the stale parent VM backup, and would be corrupt. Furthermore, another challenge is that the backup system should keep track of which parent VMs are current and have been backed up without having to traverse through all the stored backups on the backup server to search for the backup of the parent VM, as that would take additional time and resources. Instead, the system should be able to determine this information via a simple check.

Thus, the system may traverse the parent nodes of the disk layout of a child VM to determine whether any of the VM's associated with these parent nodes has been previously backed up. If they have been backed up, the system does not back up this parent VM again. This applies to both root VMs, which do not inherit from any other parent VMs, or for intermediate VMs, which inherit from another parent VM.

In some cases, this backup system and/or the VM system may reside on a cloud service. This means that the systems are located at a remote location, and the components of the system may be separated to execute on multiple hardware devices at the remote location. A user of the cloud server interacts with the backup and VM systems remotely in order to manage and/or use them. The cloud service may support multiple customers, with each having their own set of backups and VMs, and thus the cloud service may include a very large number of VMs and backups, including cloned VMs. A system to reduce the storage requirements of VMs would allow such a cloud service to save significantly on storage requirements.

FIG. 1 is a block diagram illustrating a backup system according to one embodiment of the invention. Referring to FIG. 1, system 100 includes, but is not limited to, one or more client systems 101-102 communicatively coupled to storage system 104 over network 103. Clients 101-102 may be any type of client, such as a server, a personal computer (e.g., desktops, laptops, and tablets), a "thin" client, a personal digital assistant (PDA), a Web enabled appliance, a gaming device, a media player, or a mobile phone (e.g., smartphone), etc. Network 103 may be any type of network, such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplication storage system available from EMC® Corporation (Hopkinton, Mass.).

In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, optional deduplication storage engine 107 is configured to segment the data file into multiple segments according to a variety of segmentation policies or rules. Deduplication storage engine 107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to backup data from client systems 101-102 and to store the backed up data in one or more of storage units 108, which may be deduplicated by deduplication storage engine 107. In one embodiment, backup engine 106 can back up data from a client system that is stored in a virtual operating environment such as a VM provided by a variety of VM vendors such as VMware® (Palo Alto, Calif.). The data can be backed up without having to install a backup agent within the corresponding VM and/or without having to mount the corresponding VM disk on a proxy server. Further, instead of backing up the entire VM disk, a portion or subdirectory of the VM disk can be backed up.

In this example, client 102 includes one or more VMs 113-114 hosted by VM monitor or manager (VMM) 112. Data of each of VMs 113-114 is stored in one of VM disk files 116 in physical storage 115 representing a virtual storage device of the associated VM. Data stored in VM disk files may be optionally deduplicated by deduplication storage engine 107.

A virtual machine represents a completely isolated operating environment with a dedicated set of associated resources. A virtual machine may be installed or launched as a guest operating system (OS) hosted by a host OS. Typically, a host OS represents a virtual machine monitor (VMM) (also referred to as a hypervisor) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

According to one embodiment, backup engine 106 includes VM disk parser 110 to parse a virtual disk file of a VM (e.g., virtual disk files 116 of VMs 113-114) to generate metadata describing content files stored in a virtual storage device of the VM. In one embodiment, backup engine 106 of storage system 104 accesses the VM disk file of a data processing system such as client system 102 hosting one or more VMs, where each VM corresponds to a virtual disk file storing content files of a virtual storage device of the respective VM. In one embodiment, VM disk parser 110 of backup engine 106 remotely accesses virtual disk file 116 over network 103 via an API of VMM 112 to parse virtual disk file 116 to generate metadata representing the content files contained in the virtual disk file. In one embodiment, VM disk parser 110 of backup engine 106 communicates with the VMM 112 to cause the VMM 112 to generate a snapshot of the virtual disk file 116 and to generate the metadata based on the snapshot of the virtual disk file, without having to mount the virtual disk file, for example, in a proxy server.

In one embodiment, the metadata is utilized to generate a VM disk layout data 111 that can be queried subsequently for backup purposes. The VM disk layout data 111 can be implemented in a variety of formats or architectures. In some embodiments, the VM disk layout data 111 includes a hierarchical structure of nodes. The nodes at the top or root of the disk layout data 111 represents root VMs. The nodes that extend from the root nodes represent clones or child VMs of the root VMs. These child VMs may in turn include further child VMs. These VMs that both have children VM and parent VM may also be known as intermediate VM. In some embodiments, the VM disk parser 110 in backup engine 106 traverses through the VM disk layout data 111 to determine the disk layout of a VM disk associated with a VM that is to be backed up to determine the hierarchical nodes associated with that VM. For example, if a child VM to be backed up includes an intermediate VM as a parent and a root VM as the parent of the intermediate VM, the nodes associated with the child VM would include the node representing the intermediate VM, and the node representing the root VM.

After determining the associated VMs for a VM that has been requested to be backed up, the backup engine 106 may then use this information to identify a snapshot of the child VM and a snapshot of the parent VM, and then compare these two to determine the changed blocks that are different between these two VMs. This is repeated for all the nodes in the hierarchy for the VM that has been requested to be backed up, such that all intermediate VMs also have changed blocks backed up for them. When the system encounters the root VM, its snapshot is fully backed up, as there is no parent VM for that root VM with which to determine further changed blocks information. While the snapshot for the parent VM was previously created in order to allow the creation of the cloned or child VM, the snapshot for the child VM may not exist during the backup process. In such a case, the system will first generate a snapshot of the child VM, and then compare this snapshot to the snapshot of the parent VM as described above in order to determine the changed blocks between these two VMs.

In one embodiment, deduplication storage engine 107 at the server may be utilized to back up only segments of a file or directory that have not been backed up since the last backup operation to reduce the storage space and/or the network bandwidth required for transferring the data blocks. According to one embodiment, when backing up the full virtual disk file, before the data is moved from the host to the storage, a FastCopy operation is performed which will create a copy of the original file without create any new data in a deduplicated system. The new segments will then overwrite the old-segments in the new created copy of a virtual disk file. As a result, there are two copies of the virtual disk file and each of them can be used for recovery. In some embodiments, the header of the virtual disk file and OS metadata file in guest OS are copied, and the backup is maintained in a virtual disk format which enable the virtual disk file to be added back to a running VM.

In some embodiments, two or more child VMs share the same parent VM. Deduplication storage engine 107 may further be able to determine that a parent VM has been backed up already based upon a tag on the parent VM that is set when the parent VM has been backed up previously in the same backup operation. Thus, when the backup engine 106 attempts to backup the parent VM, deduplication storage engine 107, based on a tag on the parent VM, determines that this parent VM has already been backed up and will instead link the child VM's backup of the changed blocks to the backup of the parent VM that already exists.

In some embodiments, system 100 also includes a VM management server 124. This management server communicates with all clients 102 that include VMs, such as VMs 113-114, in order to manage the VMs and provide a centralized access point for the management and control of the VMs for an administrator. The VM management server 124 may include the VM disk layout data 126. Similar to the VM disk layout data 111, the VM disk layout data 126 includes a hierarchy of nodes that represent how the VMs managed by the management server are linked together. In some embodiments, storage system 104 also includes a VM backup manager 128. The backup manager allows an administrator to administer the backups of the VMs stored in storage system 104. The backup manager 128 may receive requests from the administrator to backup or restore various VMs, including child VMs, intermediate VMs, and root VMs. The backup manager 128 may access the VM disk layout data 126 to determine the structure of the VMs in the system in order to present this structure to an administrator.

Figure 2A:
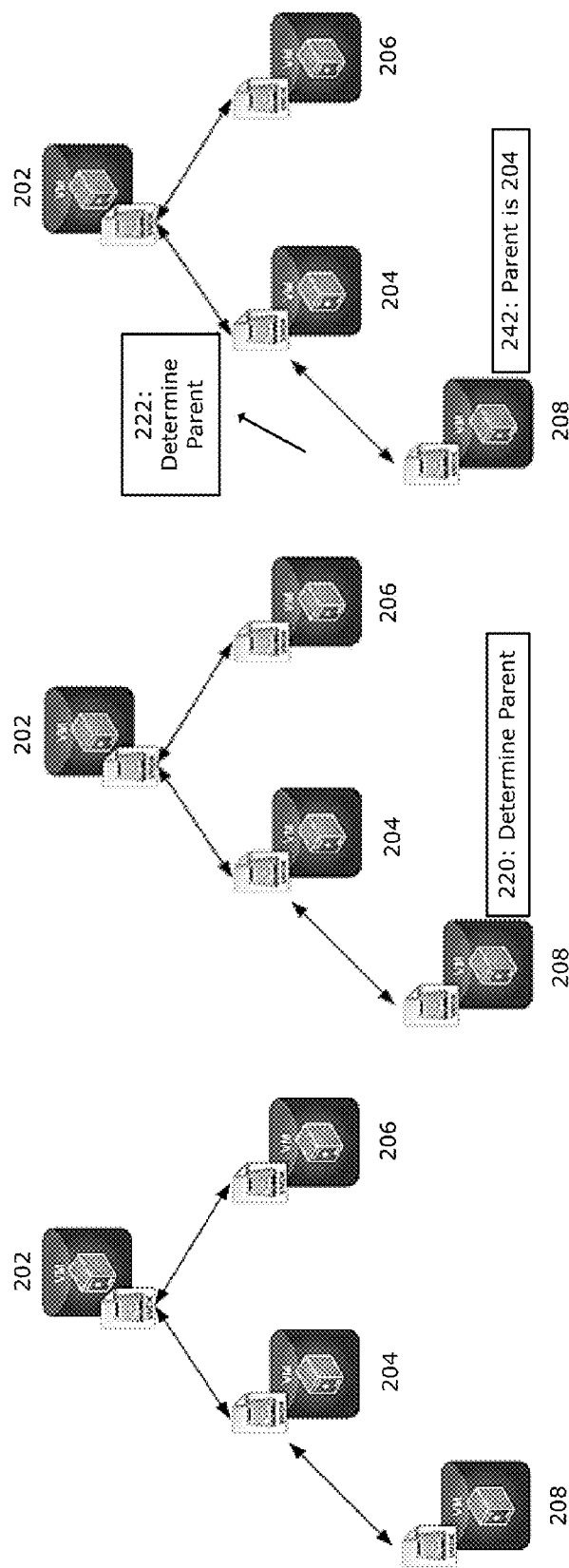
FIG. 2a is a first series of block diagram illustrating a method of backing up cloned virtual machines according to an embodiment of the invention.

FIG. 2a is a first series of block diagram illustrating a method of backing up cloned virtual machines according to an embodiment of the invention. The exemplary VMs depicted in FIG. 2a include child VMs 208 and 206, intermediate VM 204, and root VM 202. These VMs may reside on a single VM server, such as client 102, or reside on multiple VM servers. Each VM includes one or more VM disks. For child VMs, the VM disks are linked to one or more parent VM disks. The child's VM disks may further only include the data that has changed from the parent VM and do not include all the data of the parent VM disks. In some embodiments, the VMs shown in the figure are represented in a VM disk layout data, such as VM disk layout data 126. Each node in the layout data may represent a VM disk, and corresponds to an associated VM.

At 220, in the center block diagram, the system determines the parent for child VM 208. This parent is determined to be intermediate VM 204. As indicated by the arrow, after determining that the parent for 208 is 204 as indicated at 242, the system proceeds up the disk layout or VM hierarchy to 204, the parent of 208, where at 222, the system determines the parent of VM 204 (shown in the right block diagram).

Figure 2B:
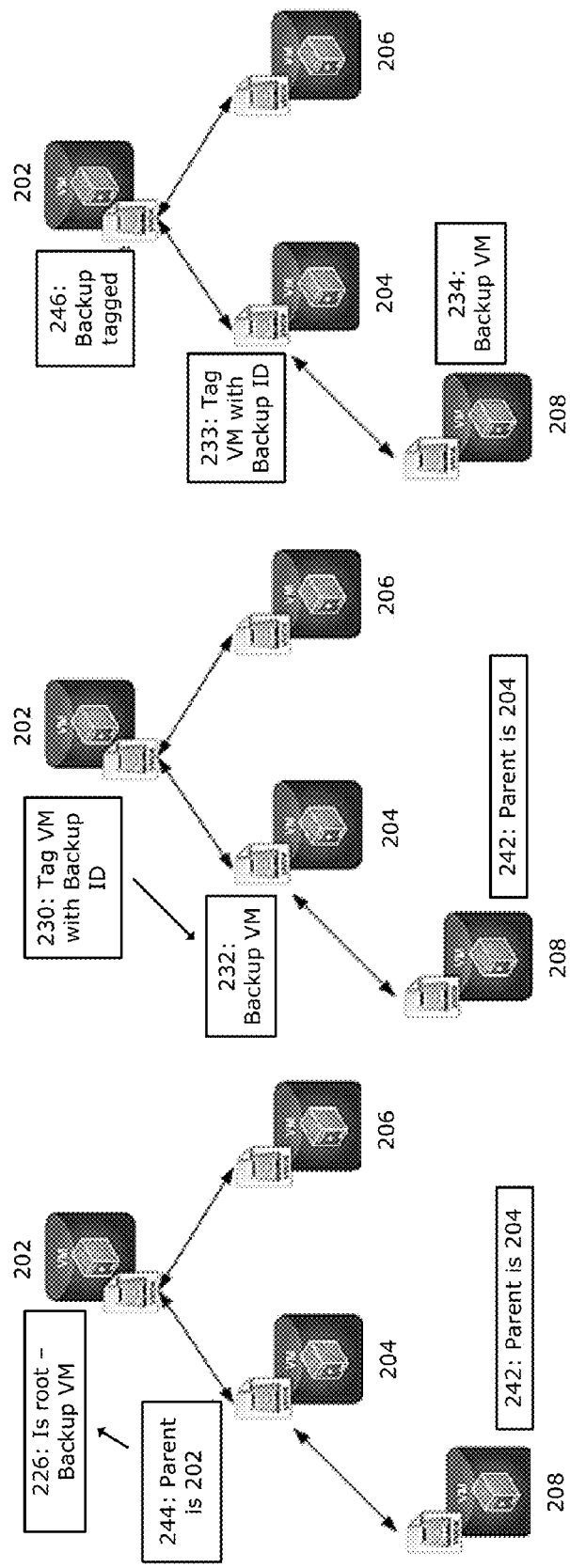
FIG. 2b is a second series of block diagrams illustrating a method of backing up cloned virtual machines according to an embodiment of the invention.

FIG. 2b is a second series of block diagrams illustrating a method of backing up cloned virtual machines according to an embodiment of the invention. At 244, the result of the determination made at 222 indicates that the parent of 204 is 202. Flow proceeds up to 228 where the system determines that 202 is a root VM. The system then proceeds to make a full backup of root VM 202. At 230, after root VM 202 has been backed up, it is tagged with a backup indicator. This indicator may uniquely identify the backup that was just made. This indicator may also include a timestamp indicating when the backup was made. After the root VM 202 has been backed up, flow proceeds according to the direction of the arrow on the reverse path from the previous bottom to top traversal. At 246, the root VM has been properly tagged. At 232, after flow proceeds back down to the next node 204, this node is also backed up. At 233, this intermediate VM 204 is also tagged with a backup ID after it has been backed up in 232. A backup ID uniquely identifies an instance of a backup image or snapshot, which can be subsequently restored using the backup ID. At 234, flow proceeds further down the chain and arrives back at the original child VM that the system received a requested to back up, and this child VM 208 is also backed up.

Figure 2C:
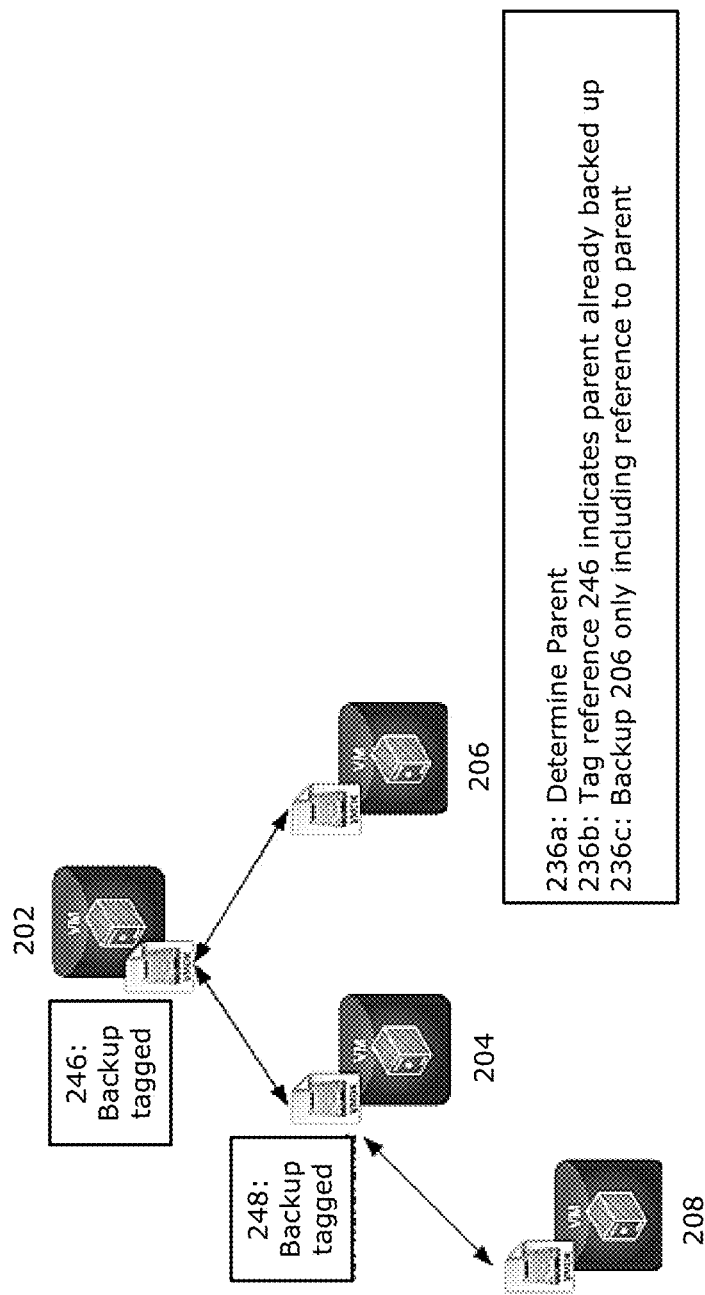
FIG. 2c is a last block diagram in the series illustrating a method of backing up cloned virtual machines according to an embodiment of the invention.

FIG. 2c is a last block diagram in the series illustrating a method of backing up cloned virtual machines according to an embodiment of the invention. As noted in 246, root VM 202 has been tagged. Furthermore, as noted in 248, intermediate VM 204 has also been tagged. When the system receives a request to backup 206, the system determines the parent of

206 at 236*a*. At 236*b*, after determining that the parent is 202, the tag indicated at 246 indicates that the parent of 206 has already been previously backed up. Thus, at 236*c*, the child VM 206 is backed up with a link to the parent without also backing up the parent again. In this fashion, the system avoids the backup of the same parent VMs during the same set of backup operations or during the same backup window.

In some embodiments, the tag includes both a backup identifier and a timestamp. The backup identifier allows the system to reference the correct backup in a backup repository that is the backup of the tagged VM. The timestamp allows the system to determine the time that the most recent backup was made. If this time is within a range corresponding to the current backup window period, then this previous backup is not stale and does not need to be backed up as a copy of it already exists. If the timestamp is before the current backup window, then the tagged VM is backed up again because the system cannot be sure that the data within the VM has not changed since the last backup indicated by the timestamp.

Figure 3:
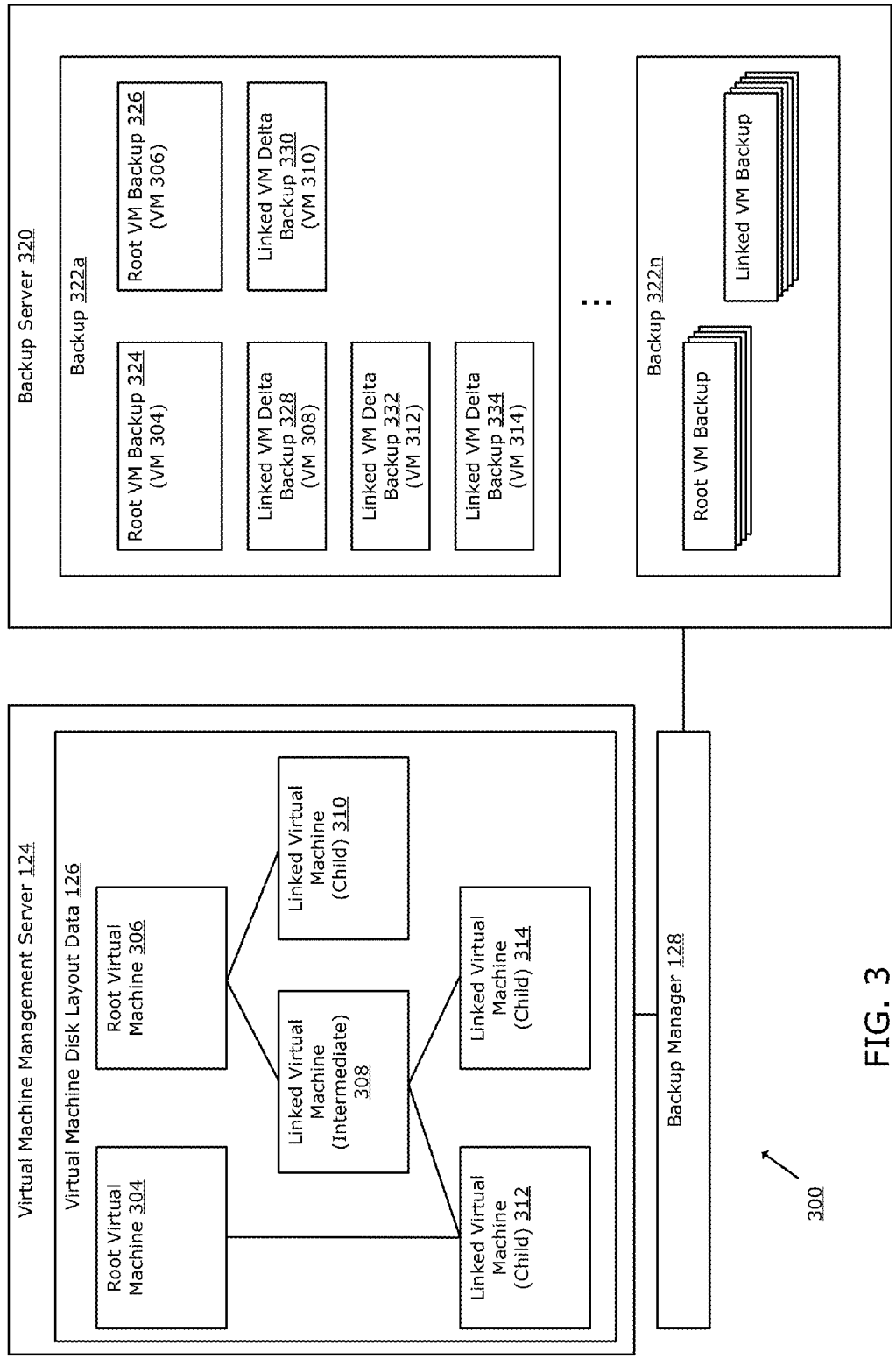
FIG. 3 is a block diagram illustrating a backup system 300 for cloned virtual machines according to an embodiment of the invention.

FIG. 3 is a block diagram illustrating a backup system 300 for cloned virtual machines according to an embodiment of the invention. Backup system 300 includes, but is not limited to, virtual machine management server 124, with an exemplary virtual machine disk layout data 126 including root virtual machines 304-306, intermediate virtual machine 308, child virtual machines 310-314. The backup system also includes a backup server 320 with backups 322*a*-322*n* corresponding to different backup jobs or windows, with an exemplary backup 322*a* including root backups 324-326 and linked backups for child VMs 328-334. In some embodiments, system 300 also includes backup manager 128.

In some cases, virtual machine server 302 supports child virtual machines (VMs) that are cloned from a parent VM. In some cases, this is created by creating a snapshot of the parent VM and basing the child VM off of this snapshot. In some cases, a snapshot is created by quiescing the parent VM, and making the parent VM read only. Further changes to the parent VM are made via sparse files that only contain the additional changes that would have been made to the corresponding original data files of the parent VM. This snapshot of the parent VM is thus frozen in time, and does not change. A child VM can then be made based off the parent VM, and will include changes to the parent VM up to the snapshot creation time. Any changes made to the child VM are also made using sparse files and the read only snapshot of the parent VM is not modified.

As shown in the exemplary virtual machine disk layout data 126, the exemplary VM system includes root VM 304 and root VM 306. These VMs do not have any parent VMs, and are the highest in the hierarchy of the disk layout. Root VM 306 includes two direct children VM, VM 308 and 310. These children VM are cloned from VM 306 as previously described. The layout also includes data about child VM 312, which is cloned from both root VM 304 and intermediate VM 308. This means that child VM 312 is linked to data files in both the snapshots of VMs 304 and 308. For example, VM 304 may include a disk labeled "A" and a disk labeled "B", and intermediate VM 308 may include a disk labeled "C". Child VM 312 may then be cloned from the disk "A" of VM 304 and the disk "C" of 308. Changes to these disks made by child VM 312 are then stored in sparse files corresponding to each parent disk and which are associated with child VM 312 and recorded in the VM disk layout data 126.

In some embodiments, this linking data for each disk is stored as backing info with each disk cloned in a child VM from a parent VM. In these cases, the system does not need to access the VM disk layout data 126, and may instead directly access the VM disk files for the VM for which a backup is requested, and analyze the backing info for this VM disk to determine which disks of which VM this particular VM disk inherits from.

The exemplary VM disk layout data 126 also includes a child VM 314. This VM also inherits from intermediate VM 308. Thus, the VM system here supports both many to one types of inheritance and one to many types of inheritance.

In some embodiments, the storage system 104 also includes a backup manager 128 as described above. This backup manager communicates with the backup server 320 or storage system 104 to initiate or generate the VM backups. The backup manager may analyze the VM disk layout data 126 when the backup manager 128 receives a backup request for a VM, and use the VM disk layout data 126 to determine which VMs are parents of the VM for which backup is requested, and initiate backups for these parent VMs as well.

The backup server 320 or storage system 104 stores the backups made via the VM management server 124. The backup server 320 may store multiple backups 322*a*-322*n*, with each backup including backups of one or more of the VMs listed in the VM disk layout data 126. Within each backup 322, the characteristics of the child and parent VMs are preserved, such that the backup for the child VMs only include those blocks that have data that is different from the same blocks of the parent VM. These blocks may be known as changed blocks. The VMs that have full backups of their entire snapshots within the backup server 320 include those VMs that are root VMs, i.e. those VMs that do not have parents. In the exemplary backup 322*a*, backups for all the VMs listed in VM disk layout data 126 are shown. Here, root VM 304 and root VM 306 have full backups 324 and 326 respectively. The child and intermediate VMs, such as VMs 308-314, only include linked VM delta backups 328-334. These backups only include those changes (deltas) between the corresponding VMs and their parent(s).

Note that although disk layout data 126 displays three levels of VMs, the system is not limited to only three levels and can store disk layouts for more than or less than three levels.

Figure 4:
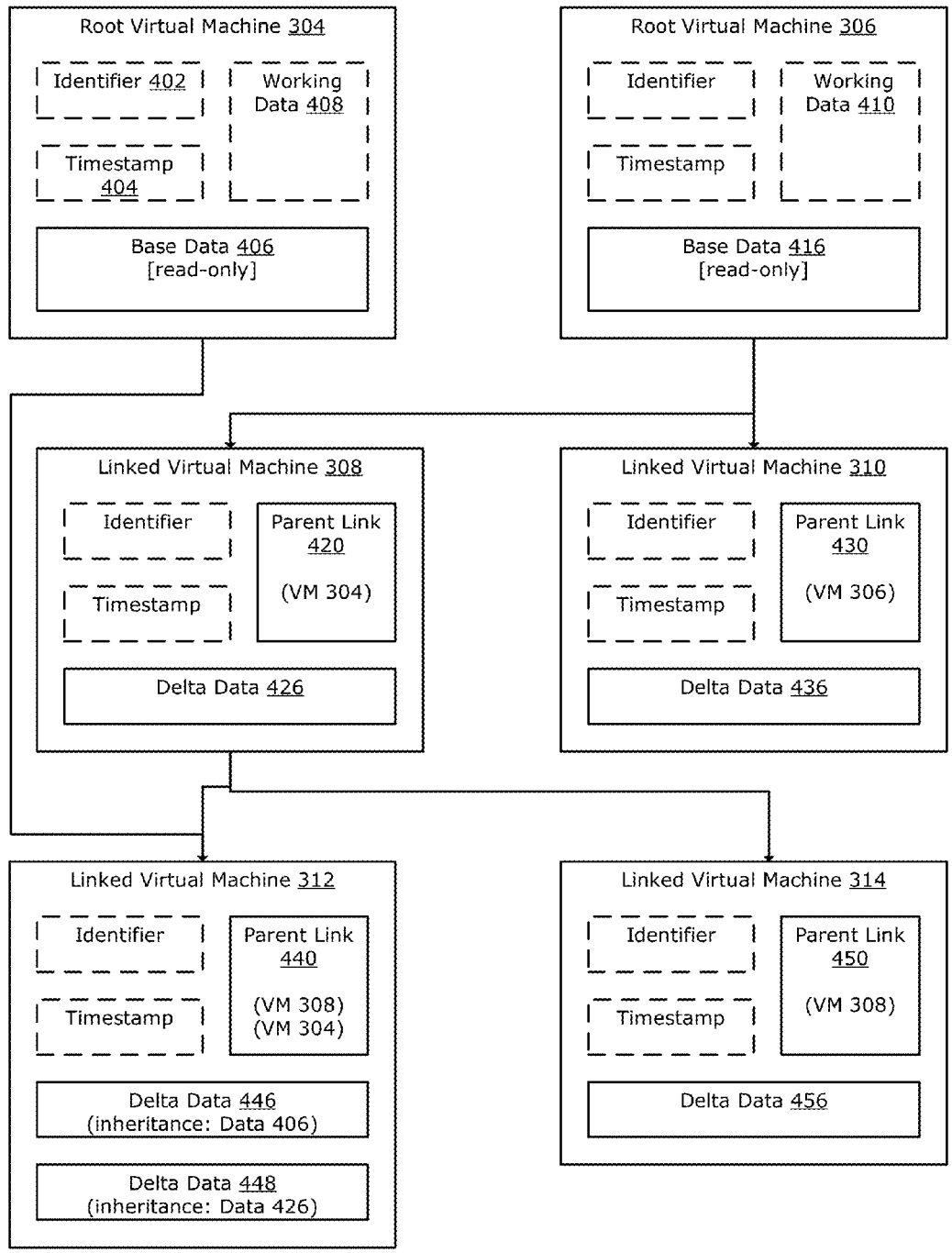
FIG. 4 is a block diagram illustrating an exemplary set of VMs 304-314 for cloned virtual machines according to an embodiment of the invention.

FIG. 4 is a block diagram illustrating an exemplary set of VMs 304-314 for cloned virtual machines according to an embodiment of the invention. FIG. 4 shows a detailed view of the VMs presented in VM disk layout data 126 in FIG. 3. Root VM 304 and root VM 306 are VMs that have not been cloned from another parent VM, but are VMs from which child VMs have been cloned from. As described previously, in order to create a child VM from a parent VM, the data, for the parent VM, such as base data 406 or 416, is made read only so that child VMs may be cloned from this data by only storing the changed blocks between this base data of the parent VM and the changed or delta data of the child VM. If additional modifications are made to the parent VM, the modifications are also stored as change or delta data for the parent based off the base data for that parent. In the exemplary FIG. 4, this change data for the parent is represented as working data 408 for root VM 304 and working data 410 for root VM 306.

Additionally, as described earlier, one optimization that can be made to the system is to tag those VMs that have already been backed up so that these VMs are not backed up again if another child VM is requested to be backed up, and that child VM also links to that parent VM. This tag is represented in the exemplary FIG. 4 as identifier 402 and timestamp 404 for root VM 304, and similarly for the other VMs. The identifier, such as identifier 402, identifies the name, label, or link for the most recent backup made for that VM. The identifier allows the system to be able to quickly identify the most recent backup without having to search through the backup server to locate it. Furthermore, the system needs to ensure that the backup of the parent VM that has already been backed up is consistent in time with the changed block backup for the child VM. In some circumstances a child VM may be changed to rely upon a more recent snapshot of a parent VM. In some circumstances the child VMs for a parent are removed and a new child VM is created from that parent VM. In these cases, if the backup system only has stored a stale or outdated version of the backup for the parent VM, then these child VMs will not be able to properly link up to the parent VM's backup. This would cause the restore to fail or the execution of the child VM process to fail or both. Thus, the system, when it encounters a tag, will check the tag to ensure that the time in the timestamp matches the current time or matches a range of time specified by the start and end of the current backup window. During the backup window, the system assumes that no changes are being made to the parent and child VMs that could cause child VM and parent VM backups to come out of synchronization. Thus, so long as the timestamp is within the time for the current backup window, in some embodiments, the system will determine that the backup of that parent VM is current and proper and will not back up the parent VM a second time.

Exemplary FIG. 4 also includes linked or child virtual machines 308, 310, and 314. These VMs are all child VMs of either intermediate or root VMs. As noted previously, these include delta data such as delta data 426, which track the changed data or blocks between the child and the parent VM from which the child was created from. Furthermore, in order for the child VM to function properly, the child VM also includes a link or other reference to the parent VM(s) from which the child VM inherits its data from. In the exemplary linked VM 308, this parent link 420 references VM 304, indicating that this child VM was created from VM 304. The exemplary linked VM 310 includes a parent link 430 to VM 306, and linked VM 314 includes a parent link 450 to VM 308.

Exemplary FIG. 4 also includes linked VM 312. This VM is different amongst those shown because it inherits from two different parents. As described above, when a child VM inherits from two different parent VMs, then that child will have one or more VM disks created from some VM disks of one parent, and another set of one or more VM disks created from some VM disks of the other parent. Here linked VM 312 includes parent link 440 pointing to parent VM 308 and parent VM 304. Furthermore, as linked VM 312 inherits from two different parents, it includes changed blocks in reference to both parents, represented by the delta data 446 that tracks changes between the child and parent VM data 406, and delta data 448, which tracks changes with parent VM data 426. Note further that data 426 is the delta data for VM 308, which itself is a child for root VM 304. Thus, VM 308 stores the changes made between it and parent VM 304, and VM 312 stores the changes made between it and parent VM 308. Thus, for delta data 448, in order to recreate the contents of the entire disk or data represented by delta data 448, the VM system needs to reference both base data 416 and delta data 426 along with the delta data 448 to determine the correct data for VM 312.

Figure 5:
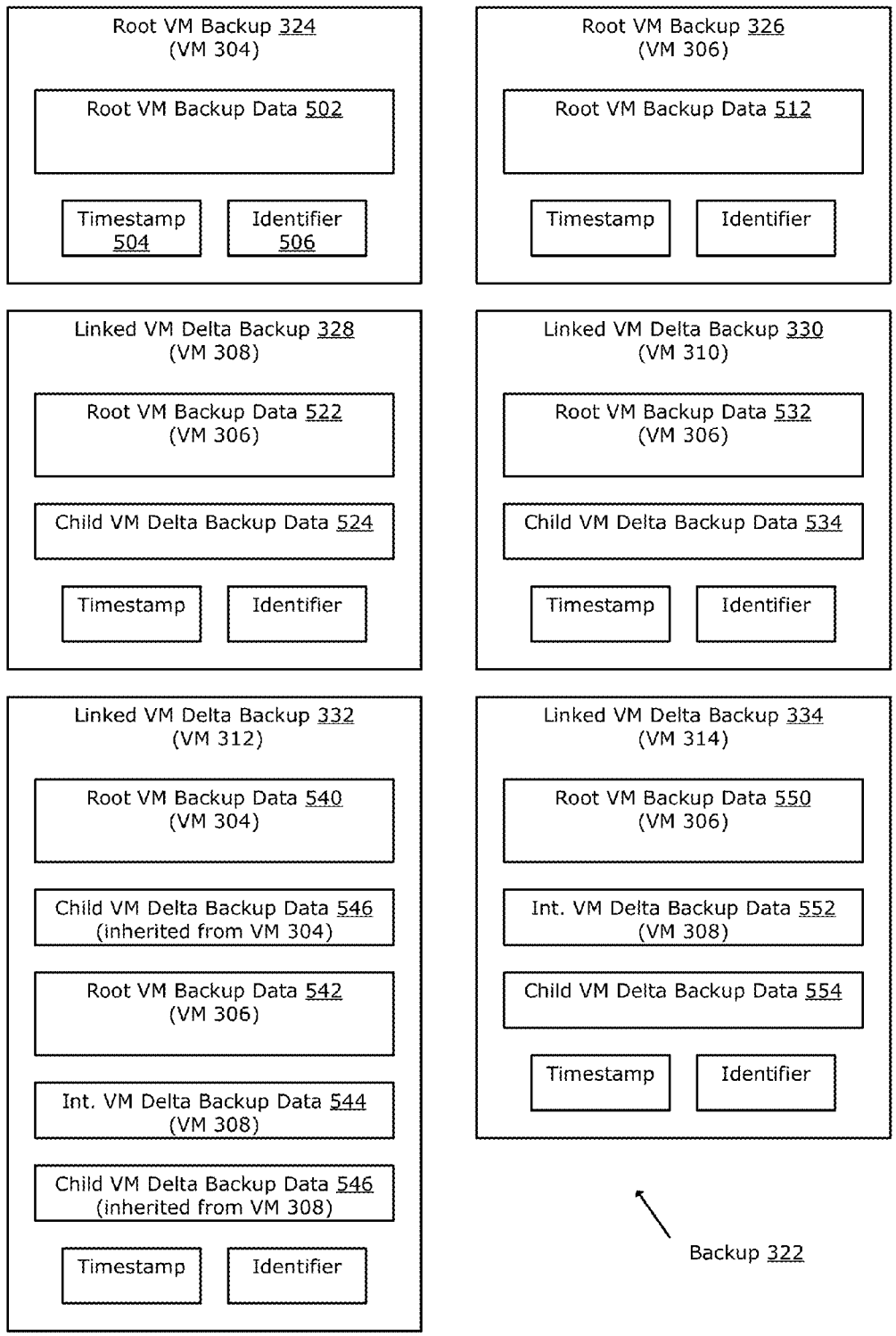
FIG. 5 is a block diagram illustrating a backup 322 with an exemplary set of VM backups 324-334 for cloned virtual machines according to an embodiment of the invention.

FIG. 5 is a block diagram illustrating a backup 322 with an exemplary set of VM backups 324-334 for cloned virtual machines according to an embodiment of the invention. In this exemplary set of backups, each backup for a VM stores the backups for the entire chain of VMs that that VM links to, from the child VM, to any intermediate VMs, to the root VM. Since root VMs do not link to any parents, the backups for root VMs, such as backups 324 and 326, simply include a backup of the root VM, such as root VM backup data 502 and 512. For linked VMs, otherwise known as cloned or child VMs, both the full backup of the root VM and any delta backups of intermediate VMs, along with the delta backup of the child VMs, are stored in the backup for the linked VM in the example of FIG. 5. For example, linked VM backup 328 is a backup of VM 308, and includes the full backup 522 that includes a backup of all the data files for the snapshot of root VM 306 that VM 308 is linked to, as well as the delta backup for VM 308, which includes the changed data blocks between the snapshot of root VM 306 represented by the backup 522 and the linked VM 308. Similarly, linked VM backup 330 includes another backup 532 for root VM 306 and a backup of the changed data blocks 534 for VM 310. Here, although both VMs 308 and 310 are linked to root VM 306, the backups for these two VMs still include full copies for the snapshot of root 306 from which they are cloned from.

Exemplary backup 322 in FIG. 5 also includes a backup 334 of VM 314. VM 314 is linked to intermediate VM 308 which is in turn linked to root VM 306. In order to have a complete backup of VM 314 that also preserves the correct disk layout for the disk associated with VM 314, the system needs to back up all the VMs in the hierarchy for VM 314. Thus, the backup 334 includes a full backup 550 of root 306, as well as a backup 552 of the changed delta blocks between the root and the intermediate VM 308, as well as a backup 554 of the same between the intermediate VM and the child VM.

Exemplary backup 322 in FIG. 5 also includes backup 332 of VM 312. As noted previously, VM 312 links to or inherits from two different parent VMs. In such a case, the backup for VM 312 should include the VMs in both hierarchies that VM 312 inherits from. Thus, backup 332 includes a backup 540 of root VM 304 along with the delta backup 546 related to this root VM, as well as backups 542, 544, and 546 that include the backups for VM 306 and 308 that the child 312 inherits from and the changed data blocks between the child 312 and the intermediate VM 308. This creates a large backup file with at least five distinct sets of backups.

In some embodiments, the backups 324-334 also include a timestamp and an identifier, such as timestamp 504 and identifier 506. These are the same as the timestamp and identifiers described in FIG. 4. In some cases, the tag on the VM that includes the timestamp and the identifier may be modified or changed erroneously or removed erroneously. In such a case, the system will rely on a backup copy of the timestamp and identifier within the backup files on the backup server. The system may scan the backup server to locate the backups corresponding to the VMs that should be tagged, and upon discovering the correct backups, the system may then copy the timestamp and identifier from the backup file to a tag on the VM.

Figure 6:
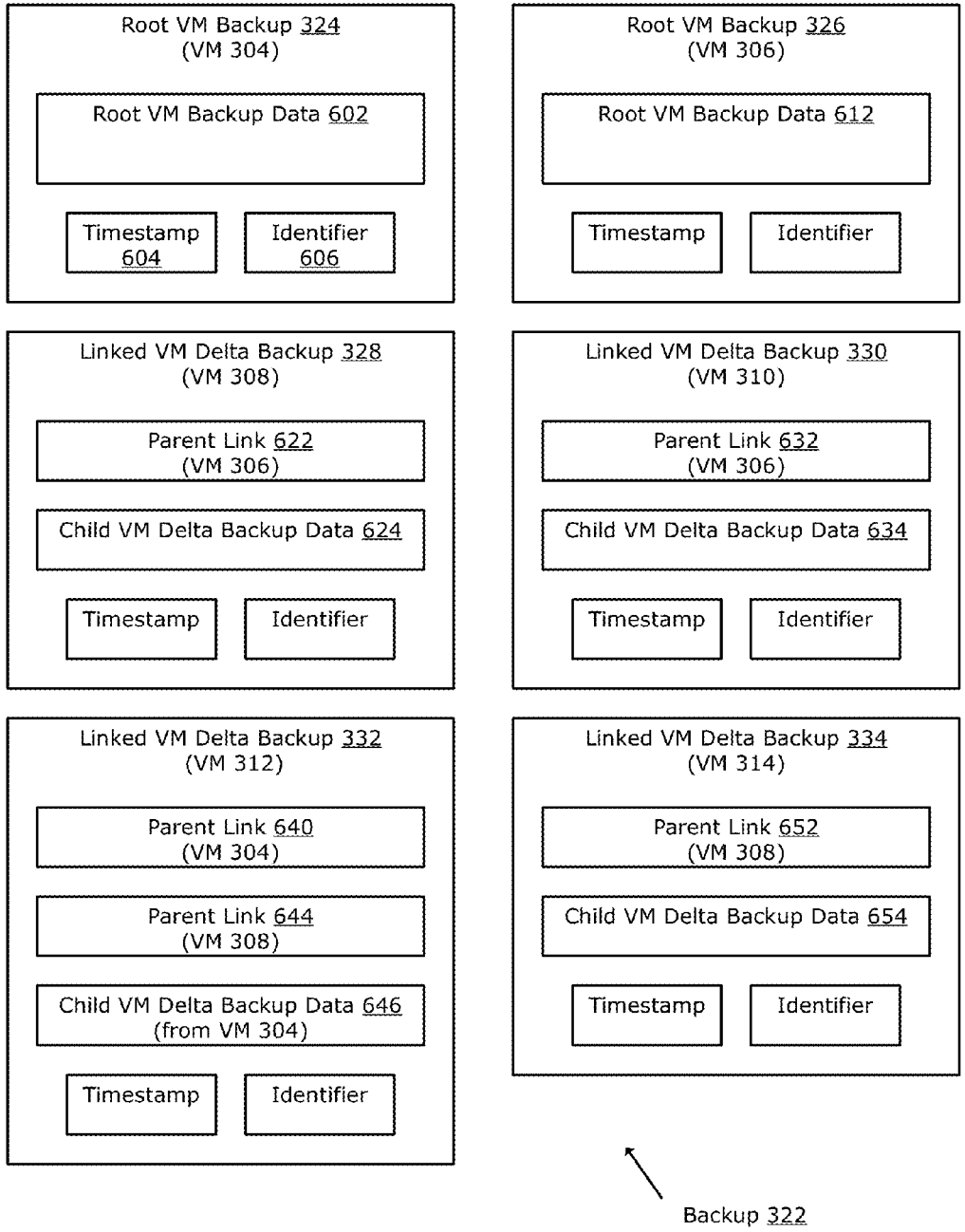
FIG. 6 is a block diagram illustrating a backup 322 with an exemplary set of VM backups 324-334 for cloned virtual machines according to an embodiment of the invention.

FIG. 6 is a block diagram illustrating a backup 322 with an exemplary set of VM backups 324-334 for cloned virtual machines according to an embodiment of the invention. While FIG. 5 depicted an exemplary set of backups 324-334 that included a copy of the parent VM backup with each backup of a linked VM, FIG. 6 depicts the same backups but with the additional optimization of deduplicating the extra copies of the backups of the parent VMs, instead only preserving a single copy of the backups of each parent VM per each backup window or backup operation.

As in the exemplary backup 322 of FIG. 5, the exemplary backup 322 of FIG. 6 includes full backups 602 and 612 for the root VMs 324 and 326. These backups may also include timestamps and identifiers, such as timestamp 604 and identifier 606. However, for linked VM backups 328-34, instead of including backup copies of intermediate or root VMs as in the exemplary backup 322 of FIG. 5, these backups now instead link to the respective parent VM, whether this VM is a root or intermediate VM. For example, linked VM backup 328 now includes a parent link 622 to VM 306 along with its own delta backup data 624, and linked VM backup 330 includes a parent link 632 to VM 306 as well, and its own delta backup data 634. As described above, the system may tag a VM once it has backed that VM up once. Here, as VM 306 was already backed up at backup 326, root VM 306 has been tagged by the system, and so when the system is requested to backup a VM that is linked to VM 306, the system will instead link that backup to the root VM backup 326. The parent link described here may use a timestamp or backup identifier (e.g., timestamp 604 or identifier 606) to identify the correct parent backup. When the system is requested to restore such a backup, instead of restoring all the files for the linked VM from the backup file of the VM, as would be the case in the exemplary backup 322 of FIG. 5, in the exemplary backup 322 of FIG. 6, the system will instead restore the parent VM from the parent VM backup linked in the parent link. If the parent link links to another intermediate VM backup, such as with parent link 652 for linked VM backup 334, the system will further traverse the links until it reaches the root VM. Once the root VM (or root VMs) are reached, these root VMs are restored to the storage system 104, if they do not already exist, and then the system reverses back down the chain of links and restores each intermediate VM's change data in turn (if they do not exist) until the system reaches the specified linked VM again, at which point it restores the delta backup for that child (e.g. delta backup 654).

In the case where a linked VM links to multiple hierarchies of VMs, such as the case for VM 312 in backup 332, the system will traverse the one or more chains of parent links (e.g., link 640 and 644) until all traversals reach root VMs. The system will then reverse down these chains and restore each VM in turn until the selected VM is once again reached, at which point the backup for that selected VM is restored (646).

In some embodiments, instead of restoring the backup as a parent VM backup and a child VM backup, the system will instead merge all VMs along a chain and restore the backup as a single VM. This may occur because of a request by an administrator, or in the event where the backup is being restored to a new client or VM server, etc.

FIG. 7 illustrates set of exemplary identifiers for a chain of linked VM disks for a child VM according to an embodiment of the invention. As described above, a child VM includes the data of a parent VM in addition to additional changes in the form of change data/blocks. When the disk layout information for a VM disk is accessed by the system, the system is able to see a list of VM disks. In some cases, the list of disks resembles the exemplary identifiers for VM disks shown in FIG. 7. In FIG. 7, three VM disk file names are shown. The identifier 706 for the disk at the bottom of the list is the disk for the child VM that has been selected. As noted above, in some embodiments, this disk is a sparse file. The identifier 704 in the middle is an identifier for a disk that is a parent for the disk identified in the last line. Note that in the exemplary identifier, the globally unique identifier (GUID) of the middle identifier is different from the GUID for the bottom identifier. This indicates that these are identifiers for different VM disks. The top most identifier 702 is the end of chain for the particular VM disk identified in the bottom line 706. This top most identifier 702 represents the VM disk for a root VM. It is the disk that the disks identified by the second and third rows inherit data from. In other words, the top most identifier 702 identifies a disk for a root VM; the middle identifier 704 identifies a disk for an intermediate VM; and the bottom identifier 706 identifies a disk for a child VM.

Figure 8:
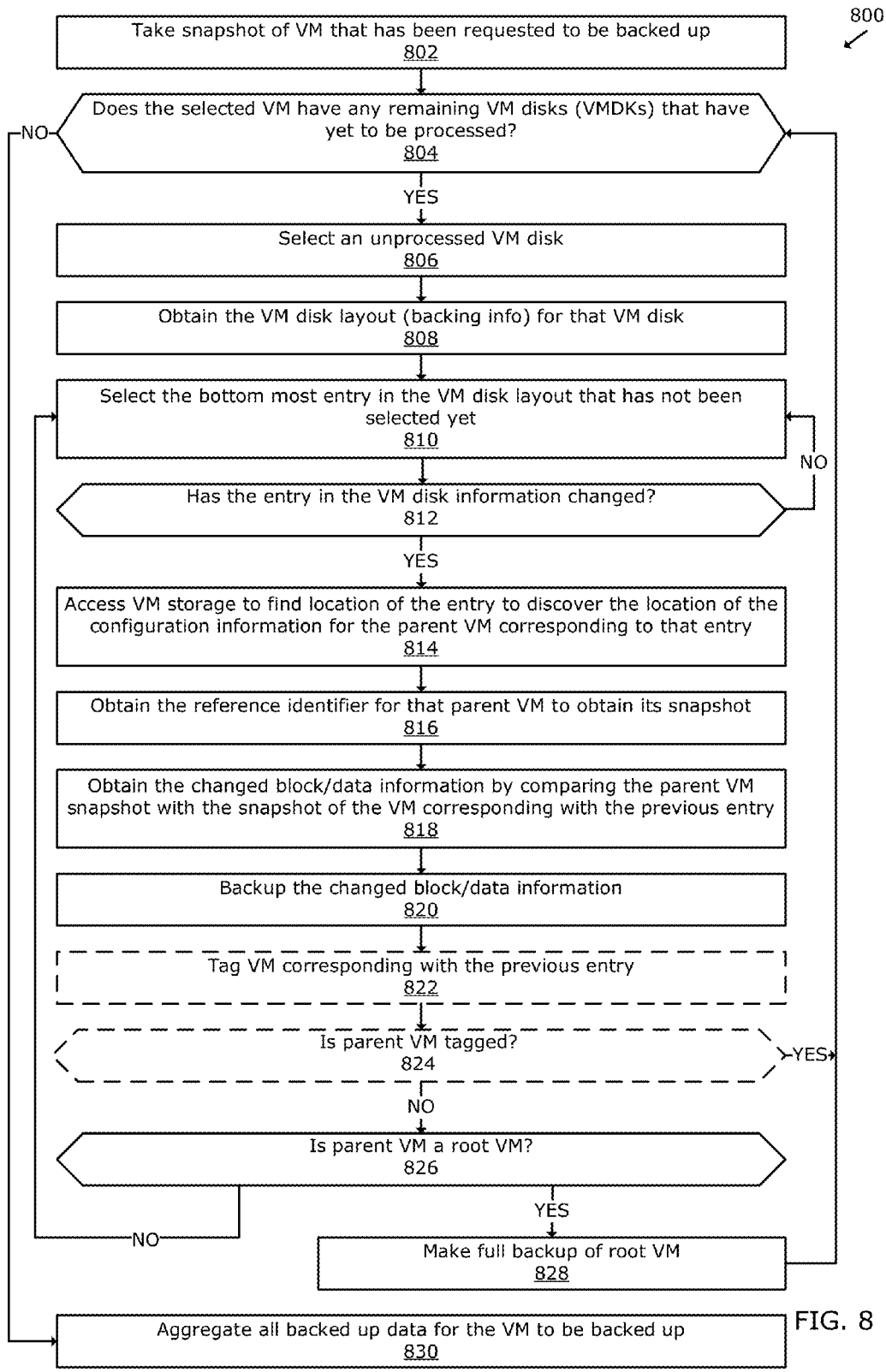
FIG. 8 is a flow diagram 800 illustrating an exemplary method of backing up cloned VMs according to an embodiment of the invention.

FIG. 8 is a flow diagram 800 illustrating an exemplary method of backing up cloned VMs according to an embodiment of the invention. The process 800 may be performed by processing logic which may include software, hardware, or a combination thereof. For example, process 800 may be performed by VM manager server 124 or backup engine 106 of FIG. 1. At 802, the system takes a snapshot of a VM that the system has received a request for backup from. In some embodiments, the snapshot is taken by backup engine 106. The snapshot may be taken using the methods described above for snapshots. At 804, the system determines whether the selected VM has any VM disks that have yet to be processed. If so, flow proceeds to 806, where the system selects an unprocessed VM disk for the selected VM.

For the selected VM disk, at 808, the system obtains the VM disk layout for that disk. In some embodiments, this disk layout is VM disk layout 111. In some embodiments, this disk layout is obtained by looking at the header or configuration information within VM disk file. The layout information may also be obtained in the format of VM disk strings, such as those depicted in FIG. 7.

At 810, the system selects the bottom most entry in the VM disk layout that has not been selected yet. The bottommost entry is the entry that is the least significant in the hierarchy of disks represented by the disk layout. The first time this selection takes place, the entry should identify the VM disk of the selected VM. For example, in the entries listed in FIG. 7, this is the bottom most entry in FIG. 7. At 812, the system determines whether this entry has changed from the previous selection. For the first time the selection is made, as no previous selection has been made, this comparison is made with the first selection. Thus, for the first selection, this determination will be answered in the negative, and flow will proceed back to 810. Furthermore, if there is only a single entry in the disk layout, then this selected VM disk is the root VM disk, and so the system will instead skip the remaining operations and backup the disk directly. In some embodiments, instead of traversing from the bottom up, the system may instead traverse from the top down in the list, i.e. from the root VM disk to the selected child VM disk.

Otherwise, at 812, the selected VM disk entry corresponds with a disk of a parent VM. The system accesses the VM disk storage to find the file location for the entry. In some embodiments, this file location is stored in a hash table. In some embodiments, the system traverses through all the files on the VM disk storage area to find the file. Once the file is found, at 814, the system can use the global identifier for this file location (e.g., a directory entry) to discover the location of the configuration file for this parent VM as the configuration file name can be ascertained based on the name of the VM disk file. For example, the configuration file may have a different file extension but have the same or similar file name as the VM disk file. After looking at the configuration file, at 818, the system is able to determine the reference identifier for that parent VM. This reference identifier is a type of global identifier that can be used by the system to instruct the VM system to look up the current snapshot for the parent VM. This is the snapshot that the child VM is currently inheriting data from.

At 818, the system obtains the change block/data that indicates the differences between the parent VM and the snapshot of the previous entry that the system had analyzed. The change data may include offsets to the VM disk of the parent VM snapshot and the value that the value at this offset has been changed to in the corresponding VM disk of the previous entry that the system has analyzed. If this is the first parent VM disk that the system has analyzed (i.e. the first changed entry in the disk layout), then this comparison is made with the snapshot of the selected VM made at 802.

At 820, the system backs up this change block information as a delta backup. In some embodiments, this delta backup is the same as the delta backups shown in FIG. 5 and FIG. 6. At 822, the system, in some embodiments, tags the VM corresponding to the previously analyzed entry to indicate that this VM has been backed up now. At 824, in some embodiments, the system determines whether the parent VM has been tagged. If the parent VM has been tagged, flow proceeds back to 804 to analyze the remaining VM disks for the selected VM, as the rest of the entries in this particular disk layout have already been backed up in this backup window based on tag. The system may additionally include a link to the location of the backup of this parent VM based on the tag. Otherwise, flow proceeds to 826.

At 826 the system determines if the parent VM is a root VM. If so, the system makes a full backup of the root VM at 828, and flow proceeds back to 804. Otherwise, flow proceeds to 810 to select the next entry in the disk layout. At 830, once all the VM disks for the selected VM have been analyzed, the system may aggregate all the backups for this selected VM into a single backup.

Figure 9A:
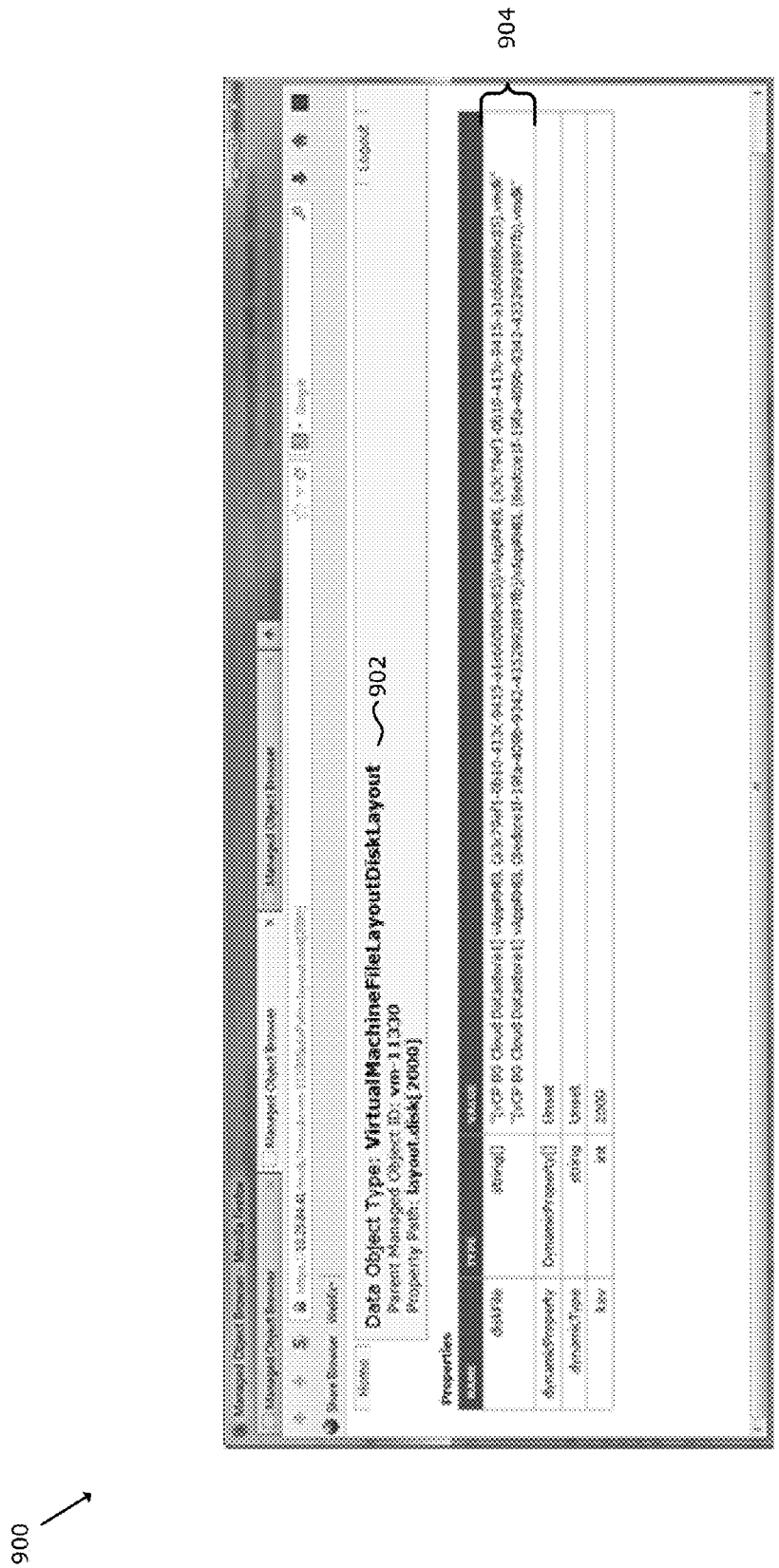
FIG. 9a illustrates an exemplary VM management server view 900 for a VM disk layout according to an embodiment of the invention.

FIG. 9a illustrates an exemplary VM management server view 900 for a VM disk layout according to an embodiment of the invention. In view 900, the VM disk being viewed is displayed by the system in 902. This particular VM disk has a single parent and a single child. The indicators for the parent and child VM disks are shown in 904.

Figure 9B:
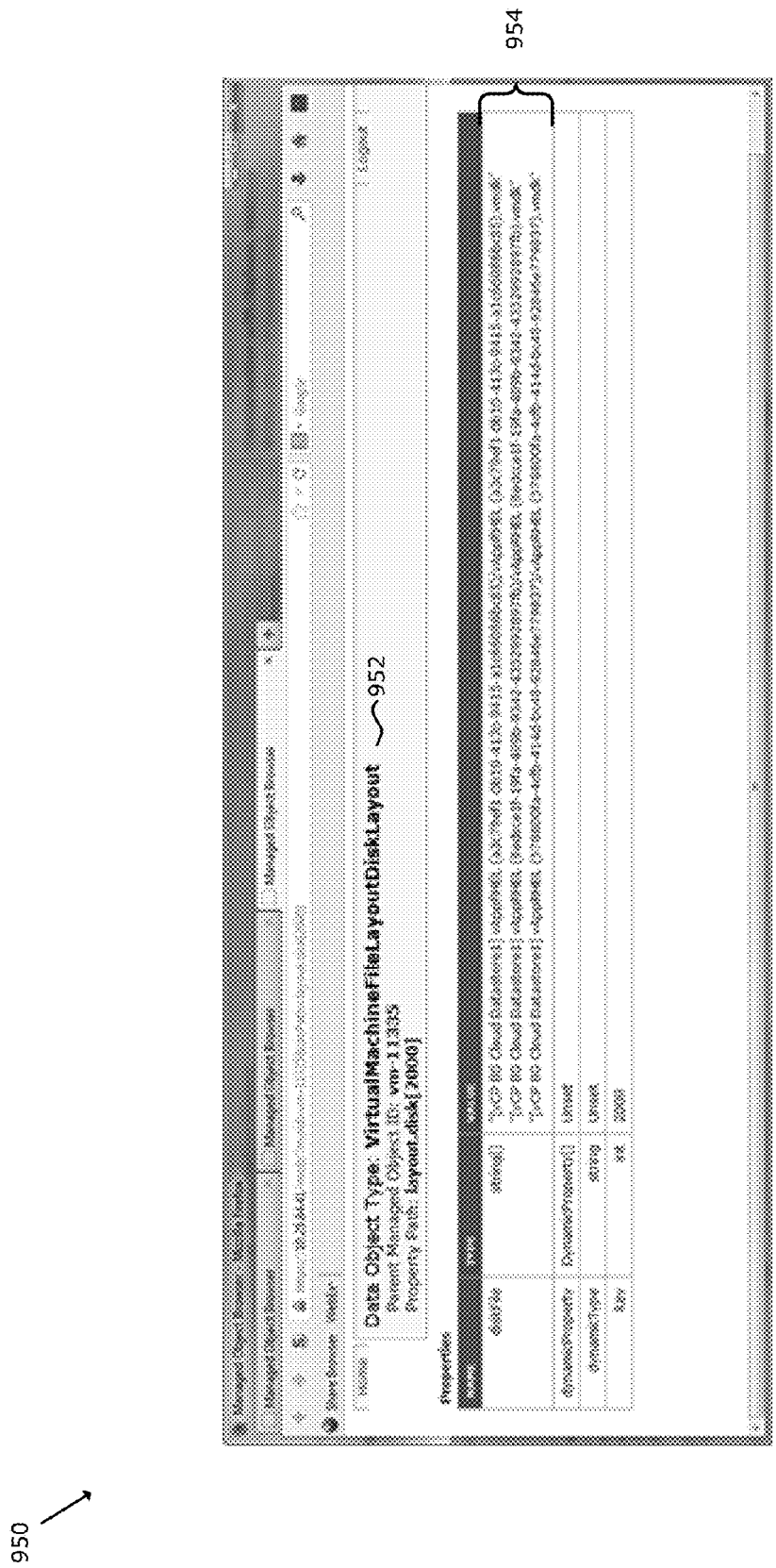
FIG. 9b illustrates another exemplary VM management server view 950 for a VM disk layout according to an embodiment of the invention.

FIG. 9b illustrates another exemplary VM management server view 950 for a VM disk layout according to an embodiment of the invention. In view 950, the VM disk being viewed is displayed by the system in 952. This particular VM disk has root, intermediate, and child VM disks. The indicators for these VM disks are shown in 954.

Figure 10:
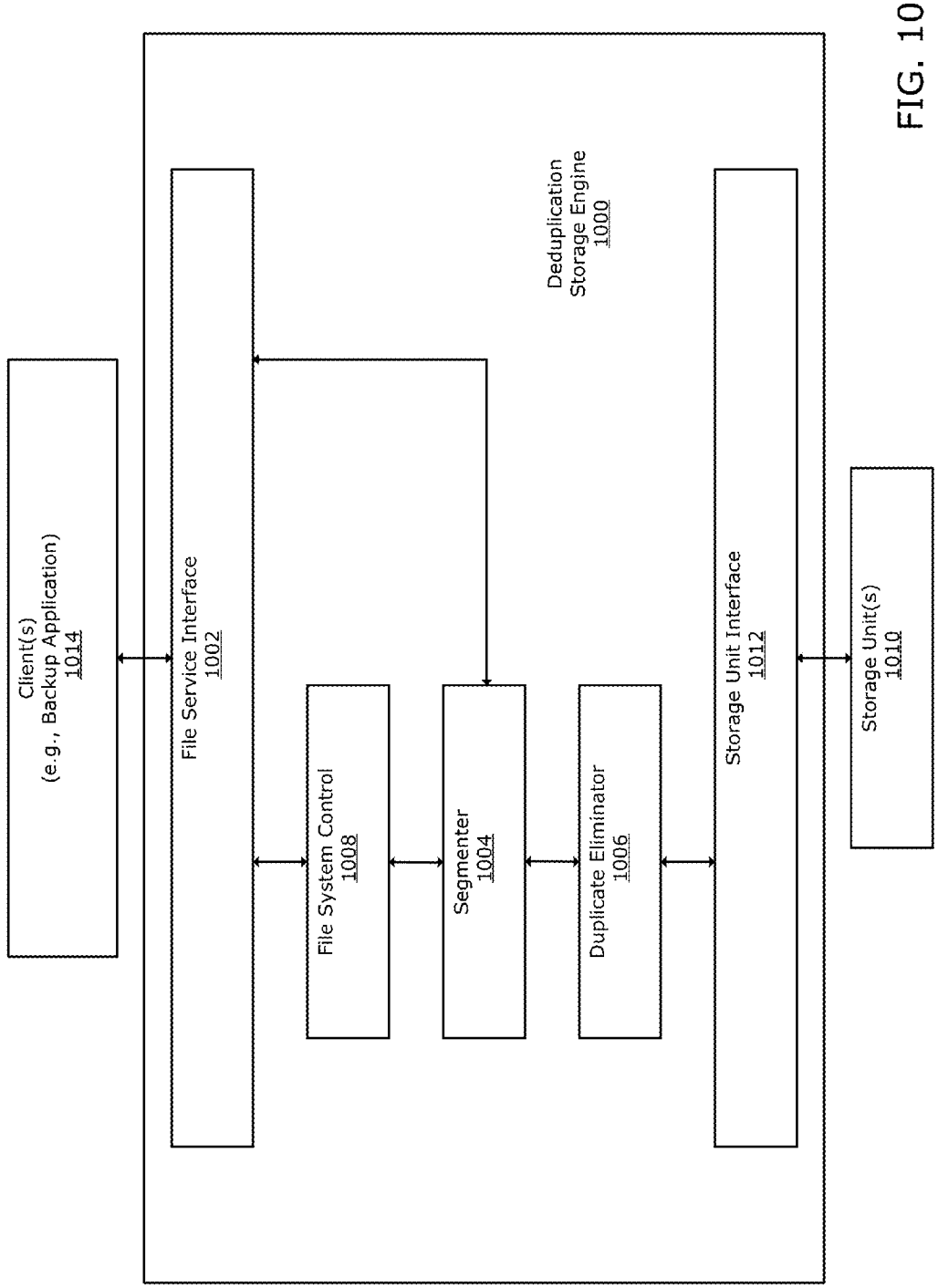
FIG. 10 is a block diagram illustrating a VM backup storage engine according to one embodiment of the invention.

FIG. 10 is a block diagram illustrating a VM backup storage engine according to one embodiment of the invention. For example, deduplication storage engine 1000 may be implemented as part of a deduplication storage system as described above, such as deduplication storage engine 107 of FIG. 1. Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008 processes information to indicate the segment(s) association with a file. In some embodiments, a list of fingerprints is used to indicate segment(s) associated with a file. File system control 1008 passes segment association information (e.g., representative data such as a fingerprint) to an index (not shown). The index is used to locate stored segments in storage units 1010 via storage unit interface 1012. Duplicate eliminator 1006 identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What we claim is:

1. A method for backing up virtual machine (VM) data, the method comprising:
    in response to a request to back up a first VM of a first storage system, determining a disk layout of a VM disk associated with the first VM to be backed up, the disk layout having a plurality of nodes in a hierarchical structure, each node corresponding one of a plurality of VMs of the VM disk;
    traversing the VM disk layout to identify one or more parent nodes with respect to a first node representing the first VM;
    for each of one or more second VMs that are related to the first VM as parent nodes,
        determining whether the second VM has been previously backed up by examining a predetermined tag associated with the second VM,
        in response to determining that the second VM has not been previously backed up,
            determining whether the second VM inherits from a third VM as a parent VM,
            backing up a list of changed blocks representing a difference between the second and third VMs, and otherwise, backing up an entire second VM from the first storage system to a second storage system, and
        tagging the second VM with the predetermined tag to indicate that the second VM has been backed up.

2. The method of claim 1, wherein traversing the VM disk layout to identify one or more parent nodes with respect to a first node representing the first VM comprises:
    traversing the VM disk layout to derive a first storage location of a first VM configuration data file of the first VM and to derive one or more second storage locations of one or more second VM configuration data files associated with one or more second VMs, wherein the one or more second VMs are parent VMs to the first VM represented in the hierarchical structure; and
    obtaining snapshots of the first VM and the second VM based on the first and second configuration data files, wherein the list of changed blocks are determined based on the difference between the snapshots.

3. The method of claim 1, wherein the second storage system is a deduplicated backup storage system.

4. The method of claim 1, wherein the predetermined tag includes a backup identifier uniquely identifying an instance of a backup associated with a corresponding VM and a backup timestamp indicating a time when the instance of the backup was made.

5. The method of claim 4, wherein a backup of the second VM is current when the backup timestamp in the predetermined tag of the second VM is within a range of time indicated by a backup window of a current backup operation.

6. The method of claim 4, wherein the backup identifier is incremented each time the corresponding VM is backed up.

7. The method of claim 4, wherein a backup of the second VM received at the second storage system also includes the predetermined tag.

8. A non-transitory computer-readable medium having computer instructions stored therein for testing a software application for backing up virtual machine (VM) data, which when executed by a processor, cause the processor to perform operations comprising:
    in response to a request to back up a first VM of a first storage system, determining a disk layout of a VM disk associated with the first VM to be backed up, the disk layout having a plurality of nodes in a hierarchical structure, each node corresponding one of a plurality of VMs of the VM disk;
    traversing the VM disk layout to identify one or more parent nodes with respect to a first node representing the first VM;
    for each of one or more second VMs that are related to the first VM as parent nodes,
        determining whether the second VM has been previously backed up by examining a predetermined tag associated with the second VM,
        in response to determining that the second VM has not been previously backed up,
            determining whether the second VM inherits from a third VM as a parent VM,
            backing up a list of changed blocks representing a difference between the second and third VMs, and otherwise, backing up an entire second VM from the first storage system to a second storage system, and
        tagging the second VM with the predetermined tag to indicate that the second VM has been backed up.

9. The non-transitory computer-readable medium of claim 8, wherein traversing the VM disk layout to identify one or more parent nodes with respect to a first node representing the first VM comprises:
    traversing the VM disk layout to derive a first storage location of a first VM configuration data file of the first VM and to derive one or more second storage locations of one or more second VM configuration data files associated with one or more second VMs, wherein the one or more second VMs are parent VMs to the first VM represented in the hierarchical structure; and
    obtaining snapshots of the first VM and the second VM based on the first and second configuration data files, wherein the list of changed blocks are determined based on the difference between the snapshots.

10. The non-transitory computer-readable medium of claim 8, wherein the second storage system is a deduplicated backup storage system.

11. The non-transitory computer-readable medium of claim 8, wherein the predetermined tag includes a backup identifier uniquely identifying an instance of a backup associated with a corresponding VM and a backup timestamp indicating a time when the instance of the backup was made.

12. The non-transitory computer-readable medium of claim 11, wherein a backup of the second VM is current when the backup timestamp in the predetermined tag of the second VM is within a range of time indicated by a backup window of a current backup operation.

13. The non-transitory computer-readable medium of claim 11, wherein the backup identifier is incremented each time the corresponding VM is backed up.

14. The non-transitory computer-readable medium of claim 11, wherein a backup of the second VM received at the second storage system also includes the predetermined tag.

15. A system for backing up virtual machine (VM) data, comprising:
   a processor; and
   a memory coupled to the processor for storing instructions which when executed from the memory, cause the processor to:
      in response to a request to back up a first VM of a first storage system, determine a disk layout of a VM disk associated with the first VM to be backed up, the disk layout having a plurality of nodes in a hierarchical structure, each node corresponding one of a plurality of VMs of the VM disk;
      traverse the VM disk layout to identify one or more parent nodes with respect to a first node representing the first VM;
      for each of one or more second VMs that are related to the first VM as parent nodes,
         determine whether the second VM has been previously backed up by examining a predetermined tag associated with the second VM,
         in response to a determination that the second VM has not been previously backed up,
            determine whether the second VM inherits from a third VM as a parent VM,
               back up a list of changed blocks representing a difference between the second and third VMs, and
               otherwise, back up an entire second VM from the first storage system to a second storage system, and
         tag the second VM with the predetermined tag to indicate that the second VM has been backed up.

16. The system of claim 15, wherein the traversal of the VM disk layout to identify one or more parent nodes with respect to a first node representing the first VM comprises instructions which when executed from the memory, cause the processor to:
   traverse the VM disk layout to derive a first storage location of a first VM configuration data file of the first VM and to derive one or more second storage locations of one or more second VM configuration data files associated with one or more second VMs, wherein the one or more second VMs are parent VMs to the first VM represented in the hierarchical structure; and
   obtain snapshots of the first VM and the second VM based on the first and second configuration data files, wherein the list of changed blocks are determined based on the difference between the snapshots.

17. The system of claim 15, wherein the second storage system is a deduplicated backup storage system.

18. The system of claim 15, wherein the predetermined tag includes a backup identifier uniquely identifying an instance of a backup associated with a corresponding VM and a backup timestamp indicating a time when the instance of the backup was made.

19. The system of claim 18, wherein a backup of the second VM is current when the backup timestamp in the predetermined tag of the second VM is within a range of time indicated by a backup window of a current backup operation.

20. The system of claim 18, wherein the backup identifier is incremented each time the corresponding VM is backed up.

21. The system of claim 18, wherein a backup of the second VM received at the second storage system also includes the predetermined tag.

* * * * *